United States Patent
Kotzin et al.

[11] Patent Number: 5,974,319
[45] Date of Patent: Oct. 26, 1999

[54] TRANSMISSION AND RECEPTION OF SIGNALS IN A COMMUNICATION SYSTEMS

[75] Inventors: Michael D. Kotzin, Buffalo Grove; Barry M. Rader, Wildwood; Barry J. Menich, Schaumburg, all of Ill.

[73] Assignee: Motorola, Inc., Schaumburg, Ill.

[21] Appl. No.: 08/975,980

[22] Filed: Nov. 21, 1997

Related U.S. Application Data

[63] Continuation of application No. 08/760,019, Dec. 4, 1996, abandoned, which is a continuation of application No. 08/083,699, Jun. 25, 1993, abandoned.

[51] Int. Cl.[6] .................................................. H04Q 7/20
[52] U.S. Cl. ..................... 455/436; 455/525; 455/553; 370/477
[58] Field of Search .............................. 455/436, 437, 455/442, 443, 524, 525, 552, 553, 62–63, 71, 67.1, 101–103, 70; 375/200, 206; 370/319–321, 330, 477

[56] References Cited

U.S. PATENT DOCUMENTS

| | | | |
|---|---|---|---|
| 4,425,642 | 1/1984 | Moses et al. | 370/76 |
| 4,457,020 | 6/1984 | King | 455/70 |
| 4,809,264 | 2/1989 | Abraham et al. | 370/76 |
| 4,811,021 | 3/1989 | Yoshimoto et al. | 455/63 |
| 4,905,221 | 2/1990 | Ichiyoshi | 370/320 |
| 4,972,455 | 11/1990 | Phillips et al. | 379/59 |
| 5,042,082 | 8/1991 | Dahlin | 455/67.1 |
| 5,103,459 | 4/1992 | Gilhousen et al. | 375/1 |
| 5,185,762 | 2/1993 | Schilling | 375/1 |
| 5,189,734 | 2/1993 | Bailey et al. | 455/33.2 |
| 5,195,091 | 3/1993 | Farwell et al. | 379/60 |
| 5,218,618 | 6/1993 | Sagey | 455/33.1 |
| 5,313,489 | 5/1994 | Menich et al. | 375/205 |
| 5,402,523 | 3/1995 | Berg | 455/34.1 |
| 5,425,030 | 6/1995 | Comroe et al. | 455/34.1 |
| 5,428,819 | 6/1995 | Wang et al. | 455/62 |
| 5,432,843 | 7/1995 | Bonta | 379/60 |
| 5,509,035 | 4/1996 | Teidemann, Jr. et al. | 455/33.2 |

OTHER PUBLICATIONS

Webster's II New Riverside University Dictionary, 1984, pp. 295 & 299.

*Primary Examiner*—Nguyen Vo
*Attorney, Agent, or Firm*—Kenneth A. Haas

[57] ABSTRACT

A dual-mode mobile station (125) transmits an AMPS signal (Td AMPS) concurrently during transmission of a DS CDMA signal (Td DS CDMA) for purposes of handoff of the mobile station from the DS CDMA system to AMPS. Scanning receivers (221) at surrounding AMPS basestations (135–138) measure the quality of the AMPS signal (Td AMPS) and determine the best base-station for handoff. To ensure a strong signal during concurrent transmission, other mobile stations not undergoing handoff are instructed to notch their transmissions during transmission by mobile station (125) of the AMPS signal (Td AMPS).

20 Claims, 6 Drawing Sheets

TRANSMISSION AND RECEPTION OF SIGNALS IN A COMMUNICATION SYSTEMS

This is a continuation of application Ser. No. 08/760,019, filed Dec. 4, 1996 and now abandoned, which is a continuation of application Ser. No. 08/083,699, filed Jun. 25, 1993 and now abandoned.

RELATED INVENTION

Reference is made to U.S. Pat. No. 5,313,489, "Signal Processing in Communication Systems" in behalf of Menich et al., filed on the same date herewith, containing related subject matter and assigned to the assignee of the present invention.

FIELD OF THE INVENTION

The present invention relates generally to dual-mode communication systems which employ spread-spectrum signals and frequency modulated signals (FM) and, more particularly, to handoff of a mobile from the spread-spectrum signalling portion of the system to the FM signalling portion of the system.

BACKGROUND OF THE INVENTION

Communication systems designed to incorporate the characteristic of communicating with many remote mobile stations for brief intervals and occupying common radio spectrum resources are termed multiple access communication systems. One type of communication system which can be a multiple access system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Information (i.e. a message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves modulo-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

A specific type of spread spectrum communication technique known as direct sequence works by modulating a carrier with a digital code sequence whose bit rate is much higher than the information signal bandwidth.

Multiple communication channels are allocated by using a plurality of spreading codes within a portion of radio spectrum, each code being uniquely assigned to a mobile station. The unique spreading codes are preferably orthogonal to one another such that the cross-correlation between the spreading codes is approximately zero. Particular transmitted signals can be retrieved from the communication channel by de-spreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is retrieved.

Handoff of the spread spectrum mobile between cell-sites in a spread spectrum system is accomplished by using the Mobile Assisted Handoff (MAHO) functions of the mobile stations. Typically, the spread spectrum mobile station makes measurements on pilot channels belonging to each cell-site. Pilot channels are unique codes in the spread spectrum system that the mobile station knows of a priori. The measurement of any one pilot channel is composed of a strength indication and a phase measurement of the pilot relative to a time standard used by the spread spectrum system. The list of pilot channels for the mobile station to use in determining handoff suitability is communicated to the mobile station at call setup time or via a special message during traffic channel operations. When the mobile station observes that the measured strength of a particular pilot channel exceeds a predetermined threshold, the mobile station shall signal the base station with this information in a request for handoff. Handoff is then enacted at the discretion of the base station equipment.

A special form of handoff known as "soft handoff" is possible in the direct sequence spread spectrum system. This is due to the fact that all communications between mobile stations and base stations take place on the same frequency/communications channel. Soft handoff allows the mobile station to communicate with several base stations simultaneously, thus enhancing reception by both the base station equipment and mobile stations.

Narrowband frequency modulation (FM) systems impart intelligence to a carrier by varying the frequency of the carrier within a predetermined range (maximum deviation). Such systems are known, and one such example applied to cellular communications is the Advanced Mobile Phone Service (AMPS) cellular system specified by the Electronic Industries Association. Because narrowband systems like AMPS do not support MAHO, handoff of a mobile station from one cell-site to another cell-site requires the intervention of the cellular system. The Mobile Switching Center (MSC) in a narrowband system determines possible target candidates for a call requiring handoff. Specifically, a scanning, or locating, receiver may be used at the current serving cell-site to detect the need for handoff (based on low received signal strength) and at the target candidate cell-site (by command of the MSC) to determine the suitability of that cell to support the call. While many handoff algorithms could, and do, exist, a handoff is typically enacted when one cell-site perceives the mobile station's signal strength to be stronger than the current serving cell-site.

As spread spectrum technology becomes incorporated into next generation cellular systems, practical system complications due to the nature of cellular systems arise. For example, in cellular systems incorporating both spread spectrum and narrowband FM channels it may become necessary to enact handoff between both sets of channels when conditions warrant. Such a handoff could only take place for mobile stations that are dual mode in nature such that they support both spread spectrum and narrowband signalling. While a mobile station is communicating with the cellular system on a spread spectrum channel, it is not possible for the narrowband portion of the system to determine handoff suitability of the mobile station as the transmissions are spread over a bandwidth larger than the narrowband channel. In addition, the FM portion of the cellular system does not support spread spectrum pilot channels. Systems may be constructed such that the spread spectrum portion of the system and the narrowband portion of the system are non-overlapping. Thus, a cellular system employing both spread spectrum coverage and narrowband coverage would need to enact handoff to preserve the continuity of a call as a mobile station moves from the area of the former to that of the latter. This is possible as mobile stations designed for the cellular system are dual-mode and are capable of generating, and interpreting, both spread spectrum and narrowband signalling. Prior art solutions to handoff from the spread spectrum portion of the system to the narrowband portion of the system assumed overlap of RF coverage between the portions. Thus, there existed no direct way to guarantee that the mobile station would experience adequate RF coverage upon completion of the handoff in a non-overlapping system.

Thus a need exists for a mechanism by which handoff may take place from the spread spectrum portion of a cellular system to the narrowband portion without increasing the equipment cost of the narrowband equipment suite while guaranteeing that a mobile station has adequate RF coverage within the narrowband portion of the cellular system upon completion of the handoff process.

DETAILED DESCRIPTION OF A PREFERRED EMBODIMENT

Figure 1:
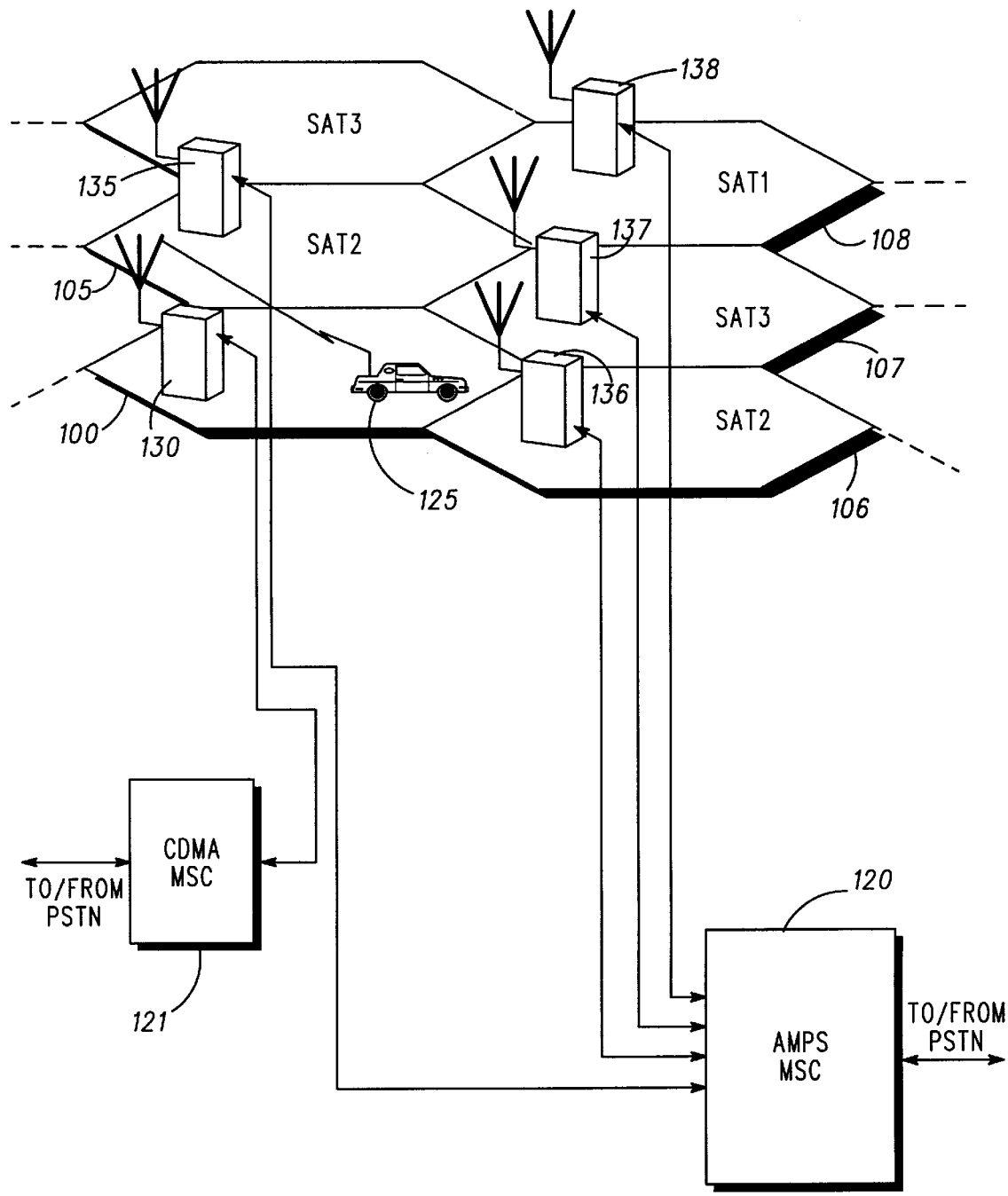
FIG. 1 generally depicts a DS CDMA base-station and AMPS base-stations coupled to respective MSCs in a communication system that may be used to beneficially employ the present invention.

Referring to FIG. 1, a cellular system comprising a spread spectrum system designated by base-station 130 in cell 100 and a surrounding analog system designated by base-stations 135–138 in cells 105–108 is shown. In the preferred embodiment, the spread spectrum system is a direct sequence code-division multiple access (DS CDMA) communication system while the analog system is the Advanced Mobile Phone System (AMPS). The analog system may also be the Narrowband Advanced Mobile Phone System (NAMPS). An example of a DS CDMA system is described in U.S. Pat. No. 5,103,459 for Gilhousen et al. filed Jun. 25, 1990, and is incorporated herein by reference. The system forward channels consist of traffic bearing channels, channels for paging and communication of system overhead information, a synchronization channel, and a pilot channel that is used for handoff purposes and phase tracking by the mobile station receiver system. As shown in FIG. 1, a mobile station 125 is engaged in an active call with the DS CDMA system. The DS CDMA system is depicted only as a single cell 100 for convenience; in reality the DS CDMA may be comprised of many cells. When surrounded by DS CDMA cells, mobile station 125 would make measurements on pilot signals emanating from base-stations of those surrounding DS CDMA system cells to determine if handoff is required within the DS CDMA system. A CDMA MSC 121 is shown separately from an AMPS MSC 120, but the two may be combined as a single MSC if desired.

In the scenario depicted in FIG. 1, a DS CDMA system is surrounded by AMPS. When mobile station 125 moves beyond the boundary of DS CDMA cell 100 into an AMPS cell, for example cell 106, DS CDMA base-station 130 detects the need for handoff by employing the results of the pilot measurements supplied by mobile station 125. Based upon the measurements supplied by mobile station 125, the DS CDMA base-station 130 determines that the mobile station 125 has moved beyond the DS CDMA coverage area and that handoff is desirable to an AMPS base-station, for example AMPS base-station 136.

Figure 2:
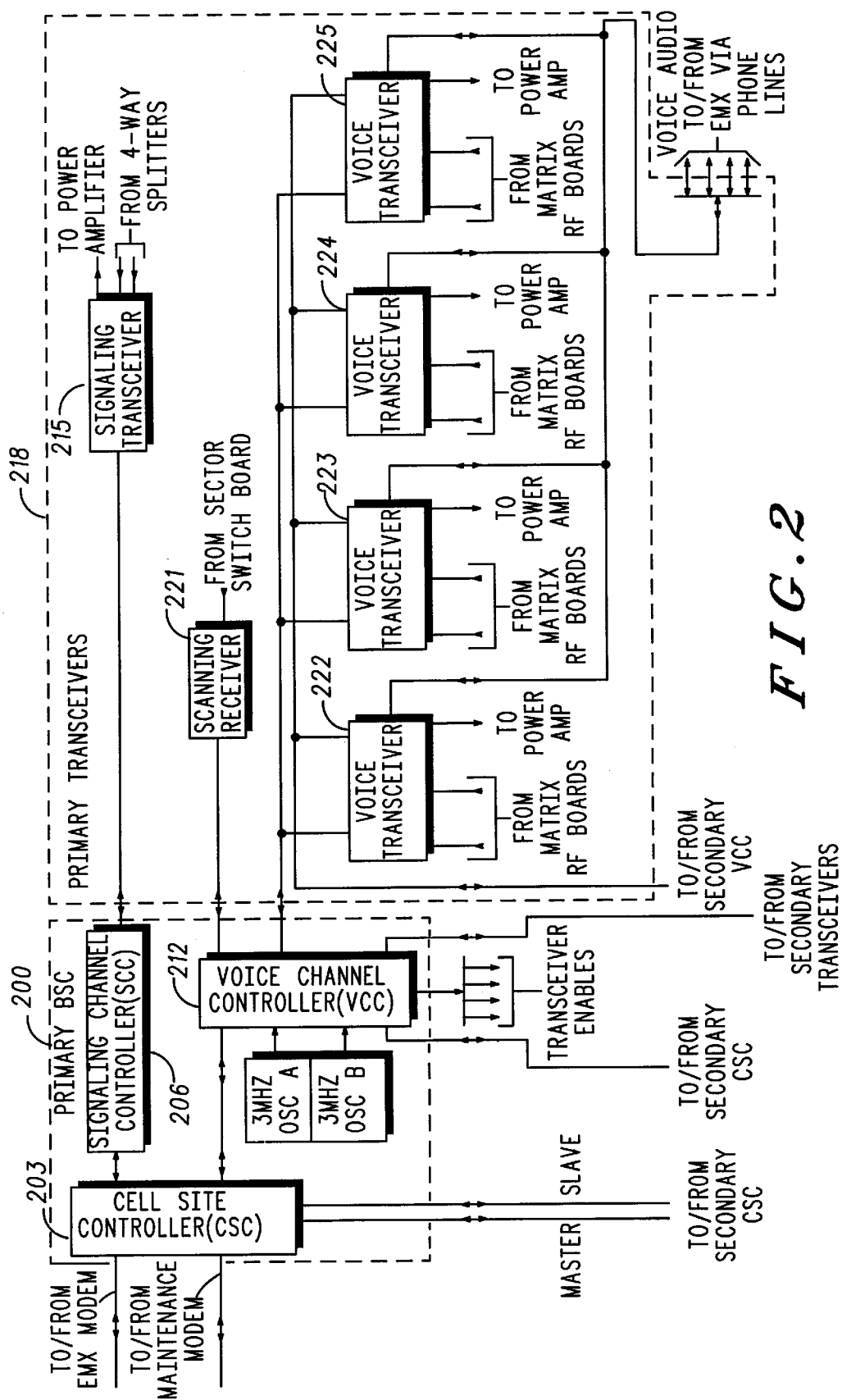
FIG. 2 generally depicts in block form a base-station controller (BSC) and transceivers located within the AMPS base-stations of FIG. 1.

Each AMPS base-station 135–138 includes a plurality of transmitters and receivers for operating on at least one duplex signalling channel and a plurality of duplex voice channels. One conventional system employs transmitters and receivers of the type described in Motorola Instruction Manual No. 68P81058E05-A published by Motorola Service Publications, Schaumburg, Ill., in 1989. FIG. 2 generally depicts transceivers and associated controlling hardware found within an AMPS base-station 135–138. A base-site controller (BSC) 200 typically consists of four circuit cards and provides the interface between AMPS base-stations 135–138 and AMPS MSC 120. A base-station controller (BSC) 200 is comprised of a cell-site controller (CSC) 203, a voice channel controller (VCC) 212, a signalling channel controller (SCC) 206, and an extend multiple port interface (EMPI) (not shown). An identical secondary set of cards can be employed to provide BSC redundancy. Together, these cards provide voice channel assignment, signalling channel control, performance monitoring, and other control functions that are used by AMPS MSC 120 to initiate calls, determine channel allocation, and make handoff decisions.

Figure 3:
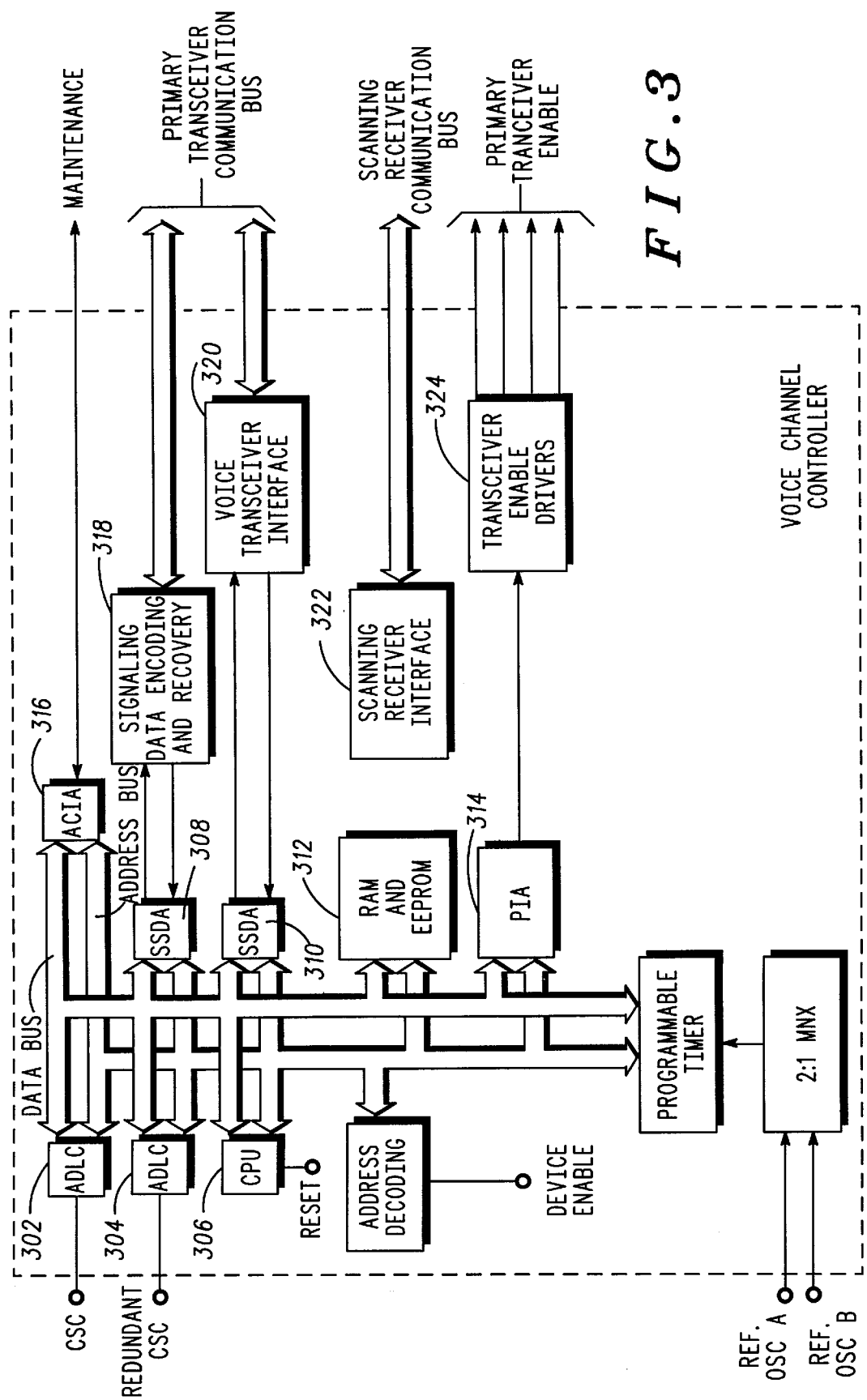
FIG. 3 illustrates a voice channel controller (VCC) located within the BSC of FIG. 2 and used to control the scanning and voice transceivers found in FIG. 2.

VCC 212 controls the primary voice transceivers 222–225 and the scanning receiver 221. FIG. 3 generally depicts a block diagram of a VCC 212 which may be employed to implement the present invention. The central processing unit (CPU 306) may be a microprocessor such as MC6809 available from Motorola, Inc. This CPU 306 is is used to control the primary voice channel transceivers 222–225 and scanning receiver(s) 221 in accordance with programmed steps stored in RAM and EPROM 312. In a non-redundant configuration of the present invention, VCC 212 may control up to 30 channels of radio equipment and one scanning receiver employing SSDA 310, voice transceiver interface 320, and scanning receiver interface 322. Signalling data encoding and decoding is controlled via SSDA 308 and signalling encoding and recovery interface 318. Transceivers are selected by enable drivers 324 which is controlled by CPU 306 via peripheral interface adaptors (PIA) 314. In the redundant configuration requiring two VCCs, each transceiver (being dual ported) can communicate with both VCCs. Under normal operating conditions, each VCC actively controls half of the channels while exchanging control and status messages with the other half. Interface to a redundant CSC is accomplished via ADLC 304.

Figure 4:
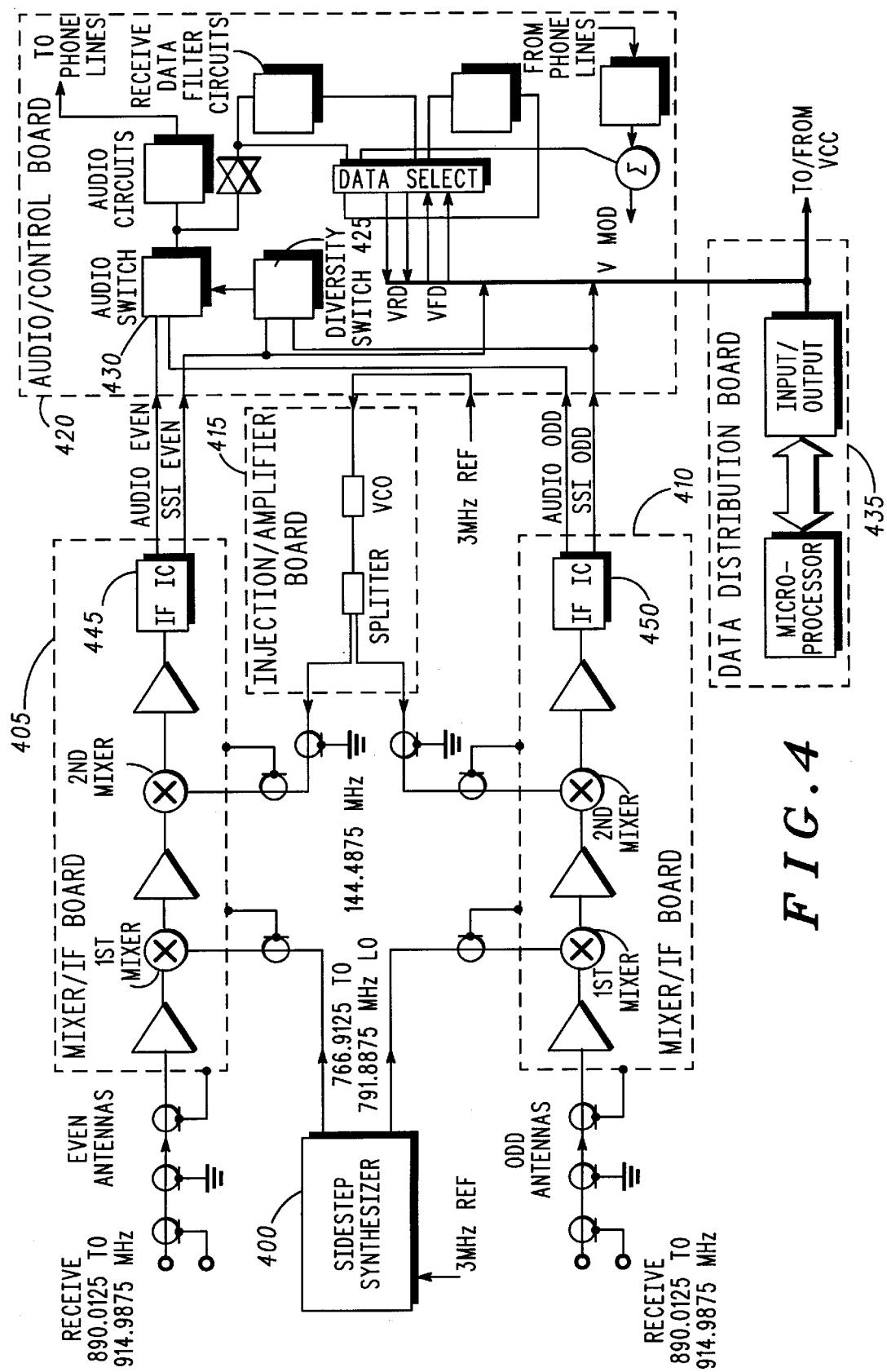
FIG. 4 generally depicts a schematic diagram of a receiver employed to receive and process a narrowband signal in accordance with the invention.

In the AMPS system, a transmitted narrowband signal from a mobile station 125 enters one of voice transceivers 222–225 via a matrix RF board (not shown) or enters a scanning receiver 221 via a sector switch board (not shown). FIG. 4 generally depicts a schematic diagram of receiver hardware employed to demodulate the transmitted narrowband signal and determine a signal quality value or signal strength indication (SSI) of the signal. Referring to FIG. 4, the receiver has as input an even and odd signal for diversity reception purposes. An even mixer/IF board 405 accepts the even signal while an odd mixer/IF board 410 accepts the odd signal. Both mixer/IF boards 405, 410 have an input from a sidestep synthesizer 400 which acts as a first local oscillator (LO) for mixing purposes. An injection/amplifier board 415 provides another input to each mixer/IF board 405, 410 and acts as a second LO for mixing purposes. The IF ICs 445, 450, which in the preferred embodiment are part number TDA 1576 available from Signetics, provide limiting, quadrature detection, and amplification to yield an audio output signal which is further amplified and fed to a audio control board 420 for processing the narrowband signal. SSI detection is performed by circuitry internal to the IF ICs 445, 450 and by discrete SSI detection range extension circuitry. The outputs of IF ICs 445, 450 individually provide linear SSI signals. These SSI signals are fed to the audio control board 420 where they are used to drive a diversity switch 425, which in turn is used to enable/disable an audio switch 430. Output from the audio switch 430 is the audio which represents the communication from the subscriber 125. This audio is output to AMPS MSC 120 via conventional phone lines.

Figure 5:
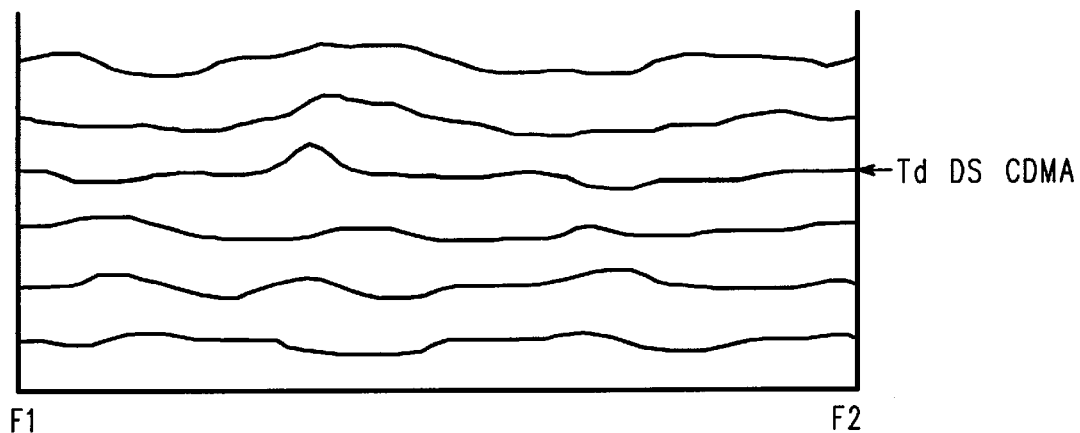
FIG. 5 generally depicts wideband, spread spectrum signals transmitted in the DS CDMA system within a bandwidth F1-F2 by a plurality of mobiles communicating with a DS CDMA base-station FIG. 6 generally depicts transmission of a narrowband, AMPS signal concurrent with the transmission of a wideband, spread spectrum (and occupying common radio spectrum), DS CDMA signal in accordance with the invention.

FIG. 5 depicts spread spectrum signals transmitted in the DS CDMA system within a bandwidth F1-F2 by a plurality of mobiles communicating with DS CDMA base-station 130. For reasons of simplicity, only mobile station 125 is depicted in FIG. 1, but in reality many mobile stations communicate with DS CDMA base-station 130 at any one time. Continuing, signal Td corresponds to the signal transmitted by mobile station 125. When DS CDMA base-station 130 determines that the mobile station 125 has moved beyond the DS CDMA coverage area and that handoff is desirable to an AMPS base-station, a mechanism must be provided to allow for handoff between the two unlike communication systems, namely the DS CDMA system and AMPS.

Figure 6:
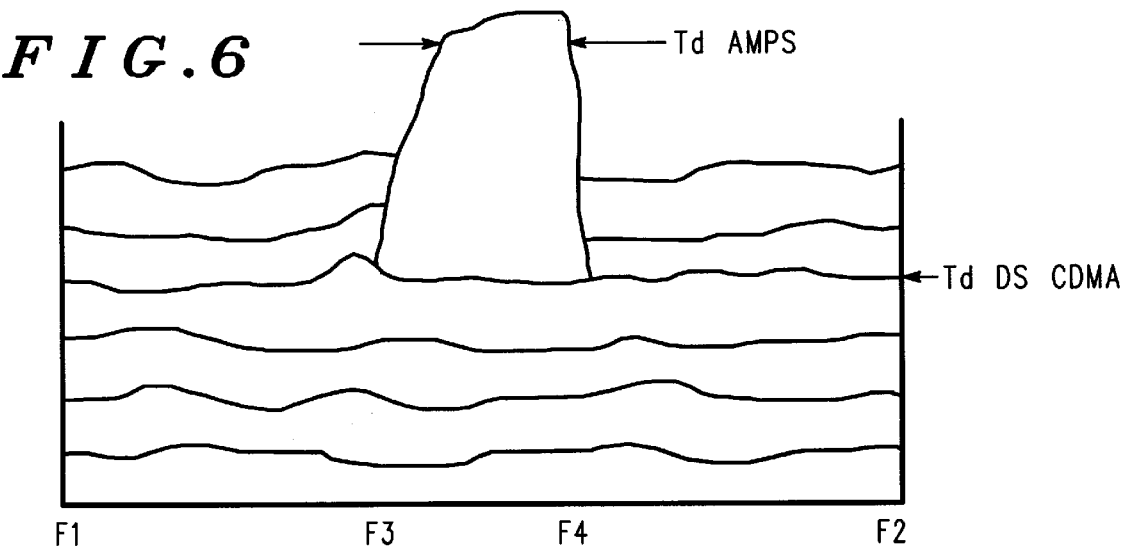

In the preferred embodiment, mobile station 125 is a dual-mode mobile station. As stated above, a dual-mode mobile station is one which is capable of of generating, and interpreting, both wideband, spread spectrum (i.e., DS CDMA) signals and narrowband (i.e., AMPS) signals. This dual-mode capability of mobile stations can be advantageously utilized to perform handoff from the wideband, spread spectrum system to the narrowband system. Referring to FIG. 6, there is depicted transmission of a narrowband, AMPS signal concurrent with the transmission of a wideband, spread spectrum, DS CDMA signal in accordance with the invention. Upon command of DS CDMA base-station 130, mobile station 125 will transmit a narrowband, AMPS signal within a bandwidth F3-F4 which is within the bandwidth F1-F2 occupied by the DS CDMA system. Mobile station 125 may frequency modulate (FM) the narrowband, AMPS signal with an identification code (e.g. SAT as is used in AMPS) to provide a positive identification mechanism for use by a scanning receiver 221 in AMPS.

Figure 7:
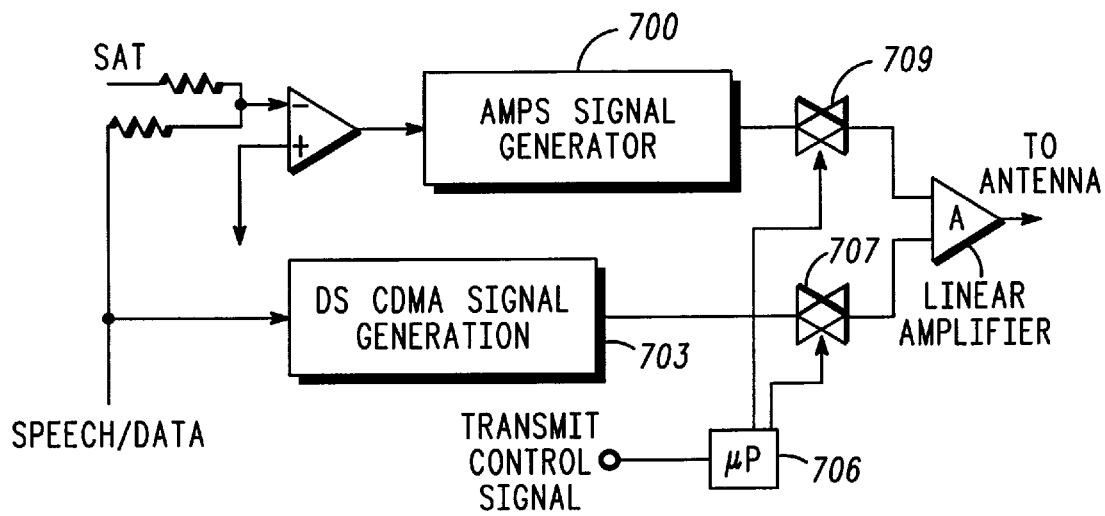
FIG. 7 generally depicts a block diagram of a dual-mode transmitter of mobile station 125 in accordance with the invention.

FIG. 7 generally depicts a block diagram of a dual-mode transmitter of mobile station 125 in accordance with the invention. As depicted in FIG. 7, AMPS signal generation block 700 and DS CDMA signal generation block 703 provide the hardware necessary to generate the corresponding signals. In the case of the AMPS signal, a SAT (or Digital SAT for NAMPS) may be modulated with the speech data to provide an identification code. A microprocessor ($\mu$P) 706 controls conventional switching gates 707, 709 to enable an output from either AMPS signal generation block 700 or DS CDMA signal generation block 703. Control of $\mu$P 706 is obtained through a transmit control signal 712 which is related to the determination by DS CDMA base-station 130 for a need for handoff.

Figure 8:
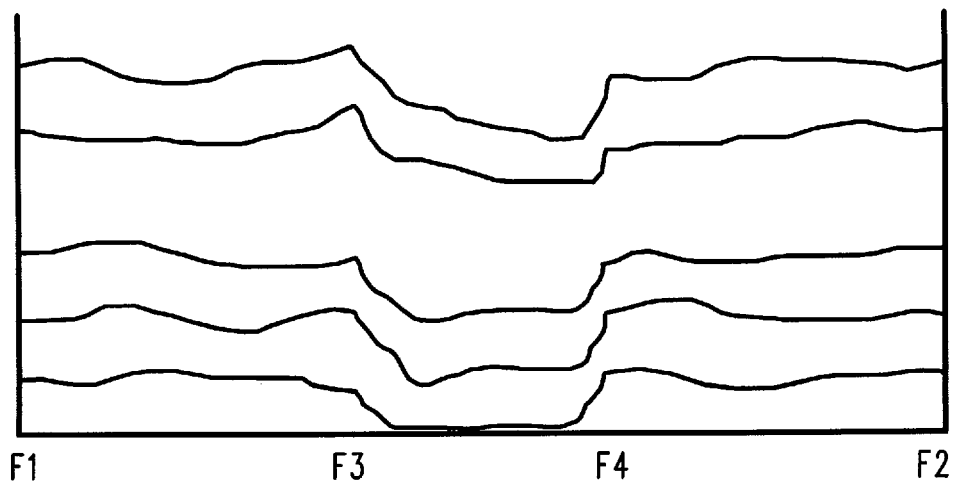
FIG. 8 depicts a notching operation by mobile stations other than a mobile station undergoing handoff in accordance with the invention.

Concurrent with the command to mobile station 125 to transmit signal Td AMPS during transmission of Td DS CDMA, DS CDMA base-station 130 commands all other transmitting mobile stations occupying the same bandwidth F1-F2 to "notch", or abstain from transmission during a certain portion (from F3-F4) during transmission of the Td AMPS signal by mobile station 125. This "notching" operation by all mobile stations other than mobile station 125 is depicted in FIG. 8, and may be accomplished by one of several prior art techniques.

At this time, DS CDMA base-station 130 sends notification to CDMA MSC 121 of the need to hand off mobile station 125 from the DS CDMA system to AMPS. CDMA MSC 121 sends a message to several AMPS base-stations, for example AMPS base-stations 135–138 to request that a scanning receiver 221 located at AMPS base-stations 135–138 detect the narrowband signal Td AMPS transmitted by mobile station 125. Scanning receivers 221 will tune to the frequency range F3-F4 of signal Td AMPS transmitted by mobile station 125, receive signal Td AMPS, process signal Td AMPS (make measurements of signal Td AMPS, search for the identification code modulated on signal Td AMPS, positively identify signal Td AMPS as belonging to the desired mobile station 125), and report on the results of this operation to AMPS MSC 120.

The information obtained from the processing is intended for purposes of communication handoff of mobile station 125 from the DS CDMA system to AMPS. AMPS MSC 120 receives the information from scanning receivers 221 at each AMPS base-station 135–138 and determines if any of AMPS base-station 135–138 can sustain the call after handoff and also which of AMPS base-stations 135–138 will provide the best call quality, according to predetermined criteria, after handoff. Simultaneously, AMPS MSC 120 informs DS CDMA base-station 130 that the necessary measurements by AMPS base-station 135–138 have been completed and that transmission of signal Td AMPS by mobile station 125 and "notching" by all other mobile stations may cease. DS CDMA base-station 130 forwards this information to the appropriate mobile stations. In an alternate embodiment, the "notching" by all other mobile stations may be terminated by the expiration of a timer.

Upon selection of a suitable AMPS base-station, AMPS MSC 120 commands that AMPS base-station to commence handoff operations appropriate for a typical target base-station in a handoff situation. Simultaneously, CDMA MSC 121 commands mobile station 125 to handoff to the selected AMPS base-station. In an alternative embodiment, a plurality of signals Td AMPS may be generated by mobile station 125 and the choice of which signal to use may be determined by predetermined agreement between the DS CDMA system and AMPS.

In an alternate embodiment, a plurality of identification codes may be transmitted by mobile station 125 to frequency modulate signal Td AMPS. Choice of such identification codes would be at the discretion of the particular MSC coordinating the entire handoff process. In another alternate embodiment of the invention, mobile station 125 may generate signal Td AMPS outside the bandwidth F1-F2 of DS CDMA system. This method would not require the above-discussed notching operation.

While the invention has been particularly shown and described with reference to a particular embodiment, it will be understood by those skilled in the art that various changes in form and details may be made therein without departing from the spirit and scope of the invention.

What we claim is:

1. A method of transmitting and receiving signals between unlike communication systems comprising the steps of:
   determining a need to handoff between a first base station and a second base station, wherein the first base station utilizes a wideband system protocol and the second base station utilizes a narrowband system protocol;
   transmitting a wideband signal having a predetermined bandwidth from a mobile station, the wideband signal being incompatible with the second base station;
   transmitting from the mobile station, a narrowband signal having a bandwidth within said predetermined bandwidth of said wideband signal, said narrowband signal transmitted concurrently with transmission of said wideband signal, the narrowband signal being incompatible with the first base station;
   receiving, at the second base station, said narrowband signal having a bandwidth within said predetermined bandwidth of said wideband signal; and
   processing, at the second base station, said narrowband signal for the purposes of handing off the mobile station from the first base station to the second base station.

2. The method of claim 1 wherein said step of transmitting a wideband signal having a predetermined bandwidth from a mobile station further comprises the step of transmitting said narrowband signal having a bandwidth within said predetermined bandwidth of said wideband signal from said mobile station during communication with a wideband communication system.

3. The method of claim 2 wherein said wideband communication system further comprises a code division multiple access (CDMA) communication system.

4. The method of claim 1, wherein said narrowband system protocol is used in a narrowband communication system, said narrowband communication system further comprises one of either AMPS or NAMPS.

5. The method of claim 1 wherein other mobile stations transmitting a wideband signal having said predetermined bandwidth are instructed to not transmit during transmission of said narrowband signal by said mobile station.

6. A method comprising the steps of:
   transmitting, from a mobile station, a signal having a predetermined bandwidth and is compatible with a first communication system;
   transmitting, from the mobile station, a signal incompatible with the first communication system, compatible with a second communication system and having a bandwidth within the predetermined bandwidth of the signal compatible with the first communication system, said transmission of the signal compatible with the second communication system transmitted concurrently with transmission of said signal compatible with the first communication system;
   receiving, at a base station, the signal compatible with the second communication system; and
   processing, at said base station, the received signal compatible with said second communication system for the purposes of handing off the mobile station.

7. The method of claim 6 wherein said step of transmitting a signal having a predetermined bandwidth and is compatible with a first communication system further comprises the step of transmitting a wideband signal having a wide bandwidth and is compatible with a code division multiple access (CDMA) communication system.

8. The method of claim 6 wherein said step of transmitting a signal compatible with a second communication system and having a bandwidth within the predetermined bandwidth of the signal compatible with the first communication system further comprises the step of transmitting a narrowband signal compatible with AMPS or NAMPS and having a narrow bandwidth within the predetermined bandwidth of the signal compatible with the first communication system.

9. The method of claim 6 wherein other mobile stations transmitting on the first communication system are instructed to not transmit during transmission of said narrowband signal by said mobile station.

10. The method of claim 6 wherein said step of processing the received signal compatible with said second communication system further comprises the step of processing the received signal compatible with said second communication system for purposes of handing off the mobile station from the first communication system to the second communication system.

11. A communication system comprising:
    means for determining a need to handoff between a first base station and a second base station, wherein the first base station utilizes a wideband system protocol and the second base station utilizes a narrowband system protocol;
    means, from a mobile station, for transmitting concurrently, a wideband signal having a predetermined bandwidth and a narrowband signal having a bandwidth within said predetermined bandwidth of said wideband signal, the wideband signal being incompatible with the second base station; and
    means, at the second base station, for receiving and processing said narrowband signal for the purposes of handing off the mobile station from the first base station to the second base station.

12. The communication system of claim 11 wherein said means, at said mobile station, for transmitting a wideband signal having a predetermined bandwidth further comprises means, at said mobile station, for transmitting said narrowband signal during communication with a wideband communication system.

13. The communication system of claim 12 wherein said wideband communication system further comprises a code division multiple access (CDMA) communication system.

14. The communication system of claim 11, wherein said narrowband system protocol is used in a narrowband communication system, said narrowband communication system further comprises one of either AMPS or NAMPS.

15. The communication system of claim 11 wherein other mobile stations transmitting a wideband signal having a predetermined bandwidth abstain from transmission during transmission of the narrowband signal by the mobile station.

16. A communication system comprising:

means, from a mobile station, for concurrently transmitting a signal having a predetermined bandwidth and is compatible with a first communication system and transmitting a second signal incompatible with the first communication system, compatible with a second communication system and having a bandwidth within the predetermined bandwidth of the signal compatible with the first communication system; and means, at the second communication system, for receiving and processing the signal compatible with the second communication system for the purposes of handing off the mobile station.

17. The communication system of claim 6 wherein said means for transmitting a signal having a predetermined bandwidth and is compatible with a first communication system further comprises means for transmitting a wideband signal having a wide bandwidth and is compatible with a code division multiple access (CDMA) communication system.

18. The communication system of claim 16 wherein said means for transmitting a signal compatible with a second communication system and having a bandwidth within the predetermined bandwidth of the signal compatible with the first communication system further comprises means for transmitting a narrowband signal compatible with AMPS or NAMPS and having a narrow bandwidth within the predetermined bandwidth of the signal compatible with the first communication system.

19. The communication system of claim 16 wherein other mobile stations transmitting on the first communication system abstain from transmission during transmission of the narrowband signal by the mobile station.

20. The communication system of claim 16 wherein said means for processing the received signal compatible with a second communication system further comprises means for processing the received signal compatible with a second communication system for purposes of handing off the mobile station from the first communication system to the second communication system.

* * * * *